US011500565B2

(12) United States Patent
Tsirkin et al.

(10) Patent No.: US 11,500,565 B2
(45) Date of Patent: Nov. 15, 2022

(54) LIBRARY-BASED MEMORY DEDUPLICATION

(71) Applicant: Red Hat, Inc., Raleigh, NC (US)

(72) Inventors: Michael Tsirkin, Lexington, MA (US); Andrea Arcangeli, Imola (IT)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/691,441

(22) Filed: Nov. 21, 2019

(65) Prior Publication Data

US 2021/0157497 A1    May 27, 2021

(51) Int. Cl.
*G06F 3/06* (2006.01)
*G06F 9/455* (2018.01)

(52) U.S. Cl.
CPC .......... *G06F 3/0641* (2013.01); *G06F 3/0608* (2013.01); *G06F 3/0673* (2013.01)

(58) Field of Classification Search
None
See application file for complete search history.

(56) References Cited

U.S. PATENT DOCUMENTS

| 8,725,956 | B2 * | 5/2014 | Eidus | G06F 12/1036 |
| | | | | 711/148 |
| 9,069,477 | B1 * | 6/2015 | Overton | G06F 12/109 |
| 9,501,421 | B1 * | 11/2016 | Cheriton | G06F 12/10 |
| 9,665,534 | B2 * | 5/2017 | Tsirkin | G06F 13/28 |
| 9,836,241 | B1 * | 12/2017 | Tsirkin | G06F 12/1009 |
| 9,983,827 | B1 * | 5/2018 | Tsirkin | G06F 3/0641 |
| 10,021,218 | B2 * | 7/2018 | Kenchammana-Hosekote | |
| | | | | G06F 12/0866 |
| 10,838,753 | B2 * | 11/2020 | Tsirkin | G06F 12/0646 |
| 2015/0074662 | A1 * | 3/2015 | Saladi | G06F 30/33 |
| | | | | 718/1 |
| 2016/0103712 | A1 | 4/2016 | Thakkar et al. | |
| 2017/0364263 | A1 * | 12/2017 | Lublin | G06F 3/0608 |
| 2018/0059956 | A1 * | 3/2018 | Tsirkin | G06F 9/45558 |

OTHER PUBLICATIONS

Fernando Vano-Garcia, "Slicedup: A Tenant-Aware Memory Deduplication for Cloud Computing", UBICOMM 2018 : The Twelfth International Conference on Mobile Ubiquitous Computing, Systems, Services and Technologies, 2018, pp. 15-20.

\* cited by examiner

*Primary Examiner* — Michael Alsip
(74) *Attorney, Agent, or Firm* — Lowenstein Sandler LLP

(57) ABSTRACT

Systems and methods for managing library-based memory deduplication are disclosed. In one implementation, a processing device may start a first instance of an application on a host computer system. Responsive to detecting that the first instance completed an initialization stage, the processing device may create a data structure referencing a first plurality of memory pages created by the first instance of the application. The processing device may further identify, among a second plurality of memory pages associated with the application, a first memory page. The processing device may also identify, among the first plurality of memory pages referenced by the data structure, a second memory page identical to the first memory page. The processing device may further modify a pointer referencing the first memory page to reference the second memory page and may release the first memory page.

20 Claims, 9 Drawing Sheets

LIBRARY-BASED MEMORY DEDUPLICATION

TECHNICAL FIELD

The present disclosure is generally related to computer systems, and more particularly, to library-based memory deduplication.

BACKGROUND

Data centers may include clusters consisting of multiple hosts (e.g., physical servers). Each of the hosts may run one or more containers, such that each container provides an isolated execution environment in the user space of the host operating system, sharing the kernel with other containers. Each container executes one or more related processes providing a certain service (e.g., an HTTP server, a database server, etc.). Data centers may also include virtual servers where, for example, various operating systems concurrently and in isolation from other operating systems may run on one or more interconnected physical computer systems. Virtualization allows, for example, consolidating multiple physical servers into one physical server running multiple virtual machines in order to improve the hardware utilization rate. Virtualization may be achieved by running a layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

BRIEF DESCRIPTION OF THE DRAWINGS

The present disclosure is illustrated by way of examples, and not by way of limitation, and may be more fully understood with references to the following detailed description when considered in connection with the Figures, in which.

DETAILED DESCRIPTION

Figure 1:
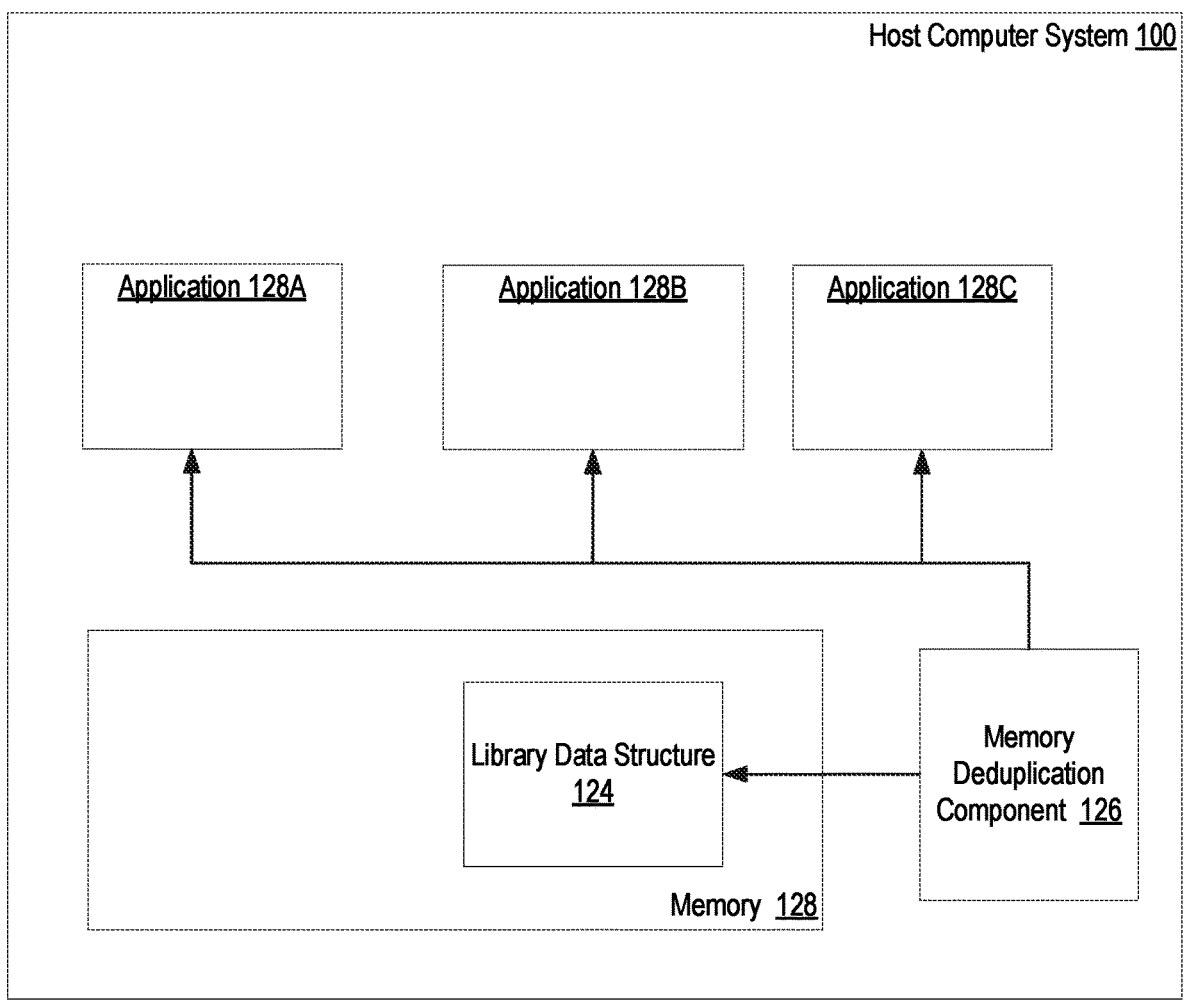
FIG. 1 is a block diagram that illustrates an embodiment of a host computer, in accordance with one or more aspects of the present disclosure.

Described herein are methods and systems for library-based memory deduplication for applications running on a host computer system (e.g. containers, virtual machines, other processes running within containers or virtual machines). Memory footprints of containers and virtual machines in data centers may be significantly large, thus limiting the number of containers that maybe installed in a given physical environment (e.g., a server). Memory footprints may be reduced by memory deduplication, i.e., by identifying a set of two or more memory pages having identical contents, and releasing all but one memory page within the set. References to memory pages within the set may further be changed to point to the one remaining memory page. A memory page may refer to a variable sized chunk of memory as determined by the application.

While memory deduplication may decrease memory footprints of applications within an execution environment, there may be security implications as a result of performing memory deduplication. In an illustrative example, in an environment where memory deduplication is enabled, a malicious party may be able to detect secure contents of a target memory page by generating multiple memory pages and detecting whether or not the target memory page is deduplicated based on one of the generated memory pages. In this example, the malicious party may attempt to predict secured contents of the target memory page by creating multiple memory pages. The host may deduplicate the target page based on detecting its match with one of the memory pages generated by the malicious party, thus giving the malicious party the confirmation that the contents of the target memory page match the contents of the generated memory page. The malicious party may be able to detect deduplication of a memory page because the latency for read and write operations of a deduplicated memory page may be different than the latency of accessing a memory page that is not deduplicated. Due to these and other security risks of allowing memory deduplication in shared execution environments, memory deduplication has generally been avoided in these environments.

One approach to enable memory deduplication for reducing memory footprints is to enable memory deduplication only for single-tenant environments. In this case, since the environment only has virtual machines owned by a single tenant, there is no security risk in potentially sharing the sensitive information. While the risk of security breach from a malicious party running as a virtual machine is avoided in this approach, other security risks may still exist when running applications within the single tenant environments. For example, a malicious party may predict secure contents of memory pages using Javascript code that is running within a web browser application on a virtual machine. If memory deduplication is enabled, a memory pages created by the java script code may be deduplicated with another memory page of the virtual machine, thus enabling the same security risks discussed above.

Another approach is to limit memory deduplication to certain ranges of memory addresses. For example, memory pages containing security sensitive information may be kept in a given range of memory page addresses while memory pages not containing security sensitive information may be kept in another range of memory addresses. Memory deduplication may then be enabled only for the ranges(s) of addresses referencing memory page with no sensitive information. This approach, however, may not be the most efficient as it may require additional overhead on the host for moving pages from one range of addresses to another as security sensitive information gets added or removed from memory pages.

The systems and methods of the present disclosure alleviate the above-noted and other deficiencies by providing a method for library-based memory deduplication. In accordance with one or more aspects of the present disclosure, an application running on a host computer system may perform memory deduplication on memory pages associated with the application. In implementations, the application may be a virtual machine managed by a hypervisor, a container managed by a supervisor, or a process running on the host computer system. In implementations, the host may select memory pages of an application for deduplications by running a background job in a dedicated thread to perform memory deduplication on at least a subset of memory pages associated with the application. For each memory page, the host may determine whether contents of the memory page are identical to contents of another memory page referenced by a library data structure.

The library data structure may be created by running a new instance of the application and stopping the new instance after its memory objects have been initialized but before any variable input data has been received by the application, thus guaranteeing that no sensitive data is stored in the application memory. For example, the host may create a new virtual machine using a standard image. The host may stop the newly created virtual machine after its memory objects have been initialized, in order to ensure that the virtual machine has reached a steady state but also before any updates can be made to the memory, potentially introducing sensitive information into the memory. In an illustrative example, the host may detect that the new virtual machine has reached a steady state when the virtual CPUs of the new virtual machine become idle. In another example, the host may detect that the new virtual machine has reached a steady state when all device drivers have completed their respective initialization routines. When the virtual machine is stopped, the addresses of the memory pages of the virtual machine may then be appended to the library data structure (which may be implemented, e.g., by an array of pointers) for the purpose of performing memory deduplication for other applications running on the host. In certain implementations, when the library is created in this way it is presumed to contain no sensitive information because it was created from an instance of the application that had no sensitive information or user-specific data. In some implementations, the library data structure may be implemented as an array of pointers to memory indexed by page contents.

In implementations, the host may identify two memory pages as identical by comparing hash values of each memory page. In an illustrative example, the host may calculate a predetermined hash function of the contents of each memory page and store each hash value in the library data structure in association with the pointer to the memory page address. In order to determine whether two memory pages are identical, the host may compare the hash values of the two memory pages. If the hash values match, the host may perform byte-to-byte comparison of the two memory pages to determine if the two memory page are identical. For example, if each byte of the first memory page matches a corresponding byte in the second memory page, then the two memory pages may be considered identical and the memory deduplication operation may be performed on the two pages (e.g., by modifying references to the memory page of the application to reference the memory page from the library data structure and releasing the memory page of the application). If, on the other hand, the two hash values do not match, or if the byte-to-byte comparison results in unmatched corresponding bytes, then the two memory pages may be considered non identical and the two memory pages may not be deduplicated with each other When the host identifies a memory page with contents that are identical to contents of a library memory page, the host may deduplicate the memory page by modifying references to the application memory page to reference the memory page from the library data structure instead. For example, the host may modify a page table entry of a virtual memory page to reference the physical address of the corresponding memory page referenced b the library data structure. A page table herein shall refer to a memory structure facilitating translation of virtual memory addresses to physical memory addresses. In an illustrative example, a page table maintained by a host computer system may include a plurality of page table entries corresponding to a plurality of memory pages mapped into the virtual address space of a virtual machine running on the host computer system. Each page table entry may represent a mapping of a virtual address of a memory page to the physical address of a corresponding physical frame. The host may then release the memory page of the application, thus freeing memory that was previously occupied by the memory page.

In certain implementations, the host may perform nested memory deduplication such that applications running within other applications may perform memory deduplication using separate library data structures. For example, a host may create a library data structure L1 for a container hosted on the host. The host may deduplicate memory of the container using L1. The host may also create another library structure L2 for deduplicating memory of a process that is running within the container. In this case, the host may deduplicate memory of the process using L2 and may deduplicate memory of the container, except memory used by the process, using L1.

In other implementations, the host may perform memory deduplication of two instances of an application using the same library data structure when each instance is running within a different container. For example, a host may create a library data structure L1 for an application A1. The host may then perform memory deduplication for an instance I1 of application A1 that is running on virtual machine VM1 using the library data structure. The host may also perform memory deduplication for an instance I2 of application A1 that is running on virtual machine VM2 using the same library data structure.

Thus, the systems and methods described herein represent improvements to the functionality of general purpose or specialized computing devices, by implementing secured application memory deduplication that reduce the amount of memory required by applications running in a host computer system. Enabling memory deduplication further facilitates improved container density within a host computer system because more containers maybe hosted in the computer system when the amount of memory required for each container is reduced. The systems and methods described herein may be implemented by hardware (e.g., general purpose and/or specialized processing devices, and/or other devices and associated circuitry), software (e.g., instructions executable by a processing device), or a combination thereof. Various aspects of the above referenced methods and systems are described in details herein below by way of examples, rather than by way of limitation.

FIG. 1 is a block diagram that illustrates an embodiment of a computer system (referred to herein as host 100) that hosts one or more applications 128A-C. Host 100 may comprise one or more computing devices with one or more processors communicatively coupled to memory devices and input/output (I/O) devices. Host 100 may refer to a computing device (e.g., physical machine), a virtual machine, or a combination thereof. A host may provide one or more levels of virtualization such as hardware level virtualization, operating system level virtualization, other virtualization, or a combination thereof. The hardware level virtualization may involve a hypervisor (e.g., virtual machine monitor) that emulates portions of a physical system and manages one or more virtual machines. In contrast, operating system level virtualization may include a single operating system kernel that manages multiple isolated virtual containers. Each virtual container may share the kernel of the underlying operating system without requiring its own kernel. The memory 128 may include volatile memory devices (e.g., random access memory (RAM)), non-volatile memory devices (e.g., flash memory), and/or other types of memory devices.

Host 100 may provide operating system level virtualization by running a computer program that provides computing resources to one or more applications 128A-C. In implementations, applications 128A-C may be containers hosted by host 100, virtual machines hosted by host 100, or other processes running on host 100. Operating system level virtualization may be implemented within the kernel of the operating system and may enable the existence of multiple isolated containers. In one example, operating system level virtualization may not require hardware support and may impose little to no overhead because programs within each of the applications may use the system calls of the same underlying operating system. Operating system level virtualization may provide resource management features that isolate or limit the impact of one application (e.g., application 128A) on the resources of another application (e.g., application 128B or 128C).

The operating system level virtualization may provide a pool of computing resources that are accessible by application 128A and are isolated from one or more other applications (e.g., container 128B). The pool of resources may include filesystem resources (e.g., particular volumes), network resources (e.g., particular network interfaces, sockets, addresses, or ports), memory resources (e.g., particular memory portions), other computing resources, or a combination thereof. The operating system level virtualization may also limit (e.g., isolate) an application's access to one or more computing resources by monitoring the containers activity and restricting the activity in view of one or more limits. The limits may restrict the rate of the activity, the aggregate amount of the activity, or a combination thereof. The limits may include one or more of filesystem limits, disk limits, input/out (I/O) limits, memory limits, CPU limits, network limits, other limits, or a combination thereof.

Each of the applications 128A-C may refer to a resource-constrained process space of host 100 that may execute functionality of a program. Applications 128A-C may refer to containers hosted by host 100, virtual machines hosted by host 100, or other processes running on host 100. Containers may be referred to as a user-space instances or a virtualization engines (VE) and may appear to a user as a standalone instance of the user space of an operating system. Each of the containers may share the same kernel but may be constrained to use only a defined set of computing resources (e.g., CPU, memory, I/O). An embodiment of the disclosure may create one or more containers to host a framework or provide other functionality of a service (e.g., web application functionality, database functionality) and may therefore be referred to as "service containers" or "application containers."

In certain implementations, applications 128A-C may refer to virtual machines (VMs) that may execute a guest operating system. VMs may utilize underlying virtual processors (vCPUs), virtual memory, and virtual I/O devices. The virtual machines may be run by a hypervisor (not shown) as a virtual machine manager that may abstract the physical layer, including physical processors, memory, and I/O devices, and present this abstraction to the virtual machines as virtual devices.

Applications 128A-C may also refer to processes running on host 100. A process may refer to an instance of any computing services in a distributed environment that may receive, transmit, or process requests and perform one or more computing tasks in view of the requests. Further, processes may be a plurality of instances of the same executable code (referred to as "plurality of processes herein"). In one example, processes may include one or more web services, database services, filesystem services, networking services, messaging services, load balancing services, clustering services, configuration management services, other services, or a combination thereof. Each process may be executed on host 100 and may function as a client process, a server process, or a combination thereof.

Memory deduplication component 126 may be a software component that provides method for library-based memory deduplication using library data structure 124. In accordance with one or more aspects of the present disclosure, memory deduplication component 126 may identify a memory page of an application 128A-C as a candidate for memory deduplication. In implementations, the memory page may be identified using a background job running in a dedicated thread to perform memory deduplication on at least a subset of memory pages associated with the application. In implementations, application 128A-C may be a virtual machine managed by a hypervisor, a container managed by a supervisor, or an application running on the host computer system. Memory deduplication component 126 may then determine whether contents of the memory page are identical to contents of another memory page referenced by library data structure 124. In certain implementations, memory deduplication component 126 may write-protect the memory page and may compare contents of the memory page to contents of another memory page in library data structure 124.

When memory deduplication component 126 identifies a memory page from library data structure 124 with contents that are identical to the contents of the application memory page, memory deduplication component 126 may deduplicate the memory page by modifying a pointer to the memory page of the application to point to the memory page from the library data structure. For example, memory deduplication component 126 may modify a page table entry of a virtual memory page to reference the physical address of the corresponding memory page referenced by library data structure. 124. Memory deduplication component 126 may then release the memory page of the application.

Library data structure 124 may be a data structure created in memory 128 in order to provide a pay load of memory pages that does not contain security sensitive information. For example, library data structure 124 may be created from publicly accessible data that has not been updated with security-sensitive or user-specific information. In implementations, memory deduplication component 126 may create library data structure 124 by running a new instance of the application, for example. The memory deduplication component 126 may stop the new instance after its memory objects have been initialized, but also before any updates can be made to the memory, potentially introducing sensitive information into the memory. The memory pages containing the data of the new instance may then be appended to library data structure 124 (which may be implemented, e.g., by an array of pointers).

Library data structure 124 may remain in memory 128 for the duration of the host computer system's current execution session. In another example, memory deduplication component 126 may create library data structure 124 by adding a new container with just the standard installation of the executable libraries of the container, thus ensuring that no user-specific data or executables exist in the new container. In this example, memory deduplication component 126 may then stop the execution of the new container upon receiving a notification from the container that all memory objects have been initialized. The memory pages containing the data of the new container may then be appended to library data structure 124 (e.g. by inserting pointers to memory pages of the new container into library data structure 124). In certain implementations, library data structure 124 may contain a set of memory pages, indexed by page contents.

Examples of "processors" (also referred herein as "processing devices" or CPUs) include various devices that are capable of executing instructions encoding arithmetic, logical, or I/O operations. In an illustrative example, a processor may follow Von Neumann architectural model and may include an arithmetic logic unit (ALU), a control unit, and a plurality of registers. In another aspect, a processor may be a single core processor which is capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket).

Examples of "memory devices" include volatile or non-volatile memory devices, such as RAM, ROM, EEPROM, or any other devices capable of storing data. Examples of "I/O devices" include devices providing an interface between a processor and an external device capable of inputting and/or outputting binary data.

Host computer system 100 may further comprise one or more Advanced Programmable Interrupt Controllers (APIC), including one local APIC 115 per processor and one or more I/O APICs 135. Local APIC 115 may receive interrupts from local sources (including timer interrupts, internal error interrupts, performance monitoring counter interrupts, thermal sensor interrupts, and I/O devices connected to the processor's local interrupt pins either directly or via an external interrupt controller) and externally connected I/O devices (i.e., I/O devices connected to an I/O APIC), as well as inter-processor interrupts (IPIs).

Certain processor architectures support inter-processor interrupts (IPI) to provide a mechanism to interrupt another processor or group of processors on the system bus. IPIs may be used for software self-interrupts, interrupt forwarding, Transaction Lookaside Buffer (TLB) shutdown, or preemptive scheduling. In an illustrative example, a processor may generate IPIs by programming the interrupt command register (ICR) in its local APIC. Writing to the ICR causes an IPI message to be generated and issued on the system bus or on the APIC bus. IPIs may be sent to other processors in the system or to the originating processor (self-interrupts). The information written into the ICR includes the type of IPI message to be sent and the destination processor identifier. When the destination processor receives an IPI message, its local APIC processes the message using the information included in the message (such as vector number and trigger mode).

Figure 2:
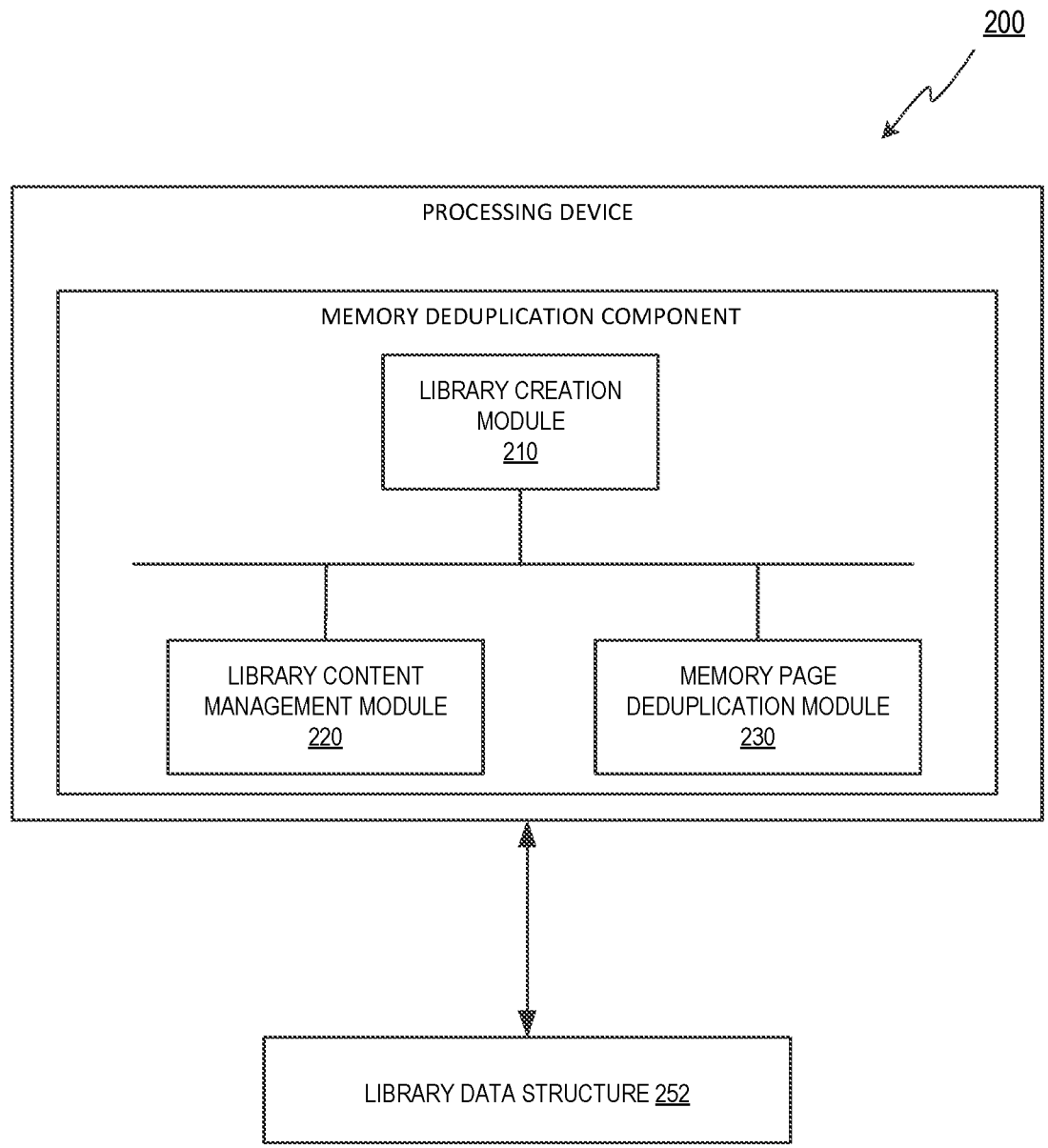
FIG. 2 depicts a block diagram of an example computer system with components for library-based memory deduplication, in accordance with one or more aspects of the present disclosure.

FIG. 2 depicts a block diagram of an example computer system 200 in accordance with one or more aspects of the present disclosure. Computer system 200 may include one or more processing devices and one or more memory devices. In the example shown, computer system 200 may include a library creation module 210, a library content management module 220, and a memory page deduplication module 230. The library creation module 210 may be where library data structure 252 is created by the processing device. Library data structure 252 may be the same or similar to library data structure 124 of FIG. 1. Library data structure 252 may be created from data containing only publicly available information, such that when memory deduplication is enabled for memory pages within the library data structure, security implications of deduplicating security-sensitive data may be avoided.

In implementations, library creation module 210 may create library data structure 252 at host startup time and keep library data structure 252 in memory for the duration of current execution session of the host. Library creation module 210 may create library data structure 252 by running a new instance of an application. Library creation module 210 may stop the new instance after its memory objects have been initialized to ensure that the new instance has reached a steady state. In one example, library creation module 210 may detect that memory initialization of the new instance is complete when input/output operations of the new instance is stopped. In another example, the new instance of the application may send a notification to library creation module 210 when memory objects have been initialized. In a third example, library creation module 210 may detect that the new instance completed the initialization stage by detecting that libraries of the new instance are loaded into memory. In yet another example, library creation module 210 may detect that the new instance completed the initialization stage when the new instance is in an idle state (e.g. waiting for input to process). When memory objects have been initialized, library creation module 210 may stop the new instance to avoid updating the data residing in memory of the new instance. The memory pages containing the data of the new instance may then be appended to library data structure 252.

In other implementations, library creation module 210 may create library data structure 252 by adding a new container with just the standard installation of the executable libraries of the container, thus ensuring that no user-specific data or executables exist in the new container. In an illustrative example, library creation module 210 may then stop the execution of the new container upon receiving a notification from the container that all memory objects have been initialized. In another example, library creation module 210 may detect the completion of memory initialization when input/output operations of the new container are stopped. The memory pages containing the data of the new container may then be appended to library data structure 252.

Library contents management module 220 may be responsible for inserting references to memory pages into the library data structure 252 and indexing the memory pages to enable for efficient search and retrieval. In one implementation, library contents management module 220 may insert pointers to memory pages into library structure 252. In this case, the physical memory pages referenced by the library data structure 252 may reside somewhere else in computer system 200. In other implementations, library contents management module 220 may insert memory mapping entries into library data structure 252, each memory mapping entry mapping a virtual memory page to a physical memory page. In yet other implementations, library contents management module 220 may insert memory pages into library data structure 252. In this case, library contents management module 220 may index library data structure by memory page contents to facilitate faster retrieval and search of memory pages within library data structure 252.

Memory page deduplication module 230 may be responsible for performing memory deduplication by determining whether contents of a memory page of an application are identical to contents of another memory page referenced by library data structure 252. In certain implementations, when comparing contents of a memory page of the application and another memory page referenced by library data structure 252, memory page deduplication module 230 may write-protect the memory page of the application and may compare contents of the memory page of the application to contents of another memory page in library data structure 252. In an implementation, memory page deduplication module 230 may identify two memory pages as identical by comparing hash values of each memory page. In an illustrative example, memory deduplication module 230 may calculate a predetermined hash function of the contents of each memory page and may compare the hash values of the two memory pages. If the hash values match, memory deduplication module 230 may perform byte-to-byte comparison of the two memory pages to determine if the two memory page are identical. For example, if each byte of the first memory page matches a corresponding byte in the second memory page, then the two memory pages may be considered identical and memory deduplication logic may be performed on the two pages. If, on the other hand, the two hash values do not match, or if the byte-to-byte comparison results in unmatched corresponding bytes, then the two memory pages may be considered non identical and the two memory pages may not be deduplicated with each other.

When memory page deduplication module 230 identifies a memory page from library data structure 252 with contents that are identical to the contents of the memory page of the application, memory page deduplication module 230 may deduplicate the memory page of the application. For example, memory page deduplication module 230 may modify a pointer to the memory page of the application to point to the memory page from library data structure 252.

For simplicity of explanation, the methods of this disclosure are depicted and described as a series of acts. However, acts in accordance with this disclosure may occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. Each method described herein and/or each of its individual functions, routines, subroutines, or operations may be performed by one or more processing devices of the computer system (e.g., host 100 of FIG. 1) implementing the method. In certain implementations, the method may be performed by a single processing thread. Alternatively, the method may be performed by two or more processing threads, each thread executing one or more individual functions, routines, subroutines, or operations of the method. In an illustrative example, the processing threads implementing the method may be synchronized (e.g., using semaphores, critical sections, and/or other thread synchronization mechanisms). Alternatively, the processing threads implementing the method may be executed asynchronously with respect to each other.

Figure 3A:
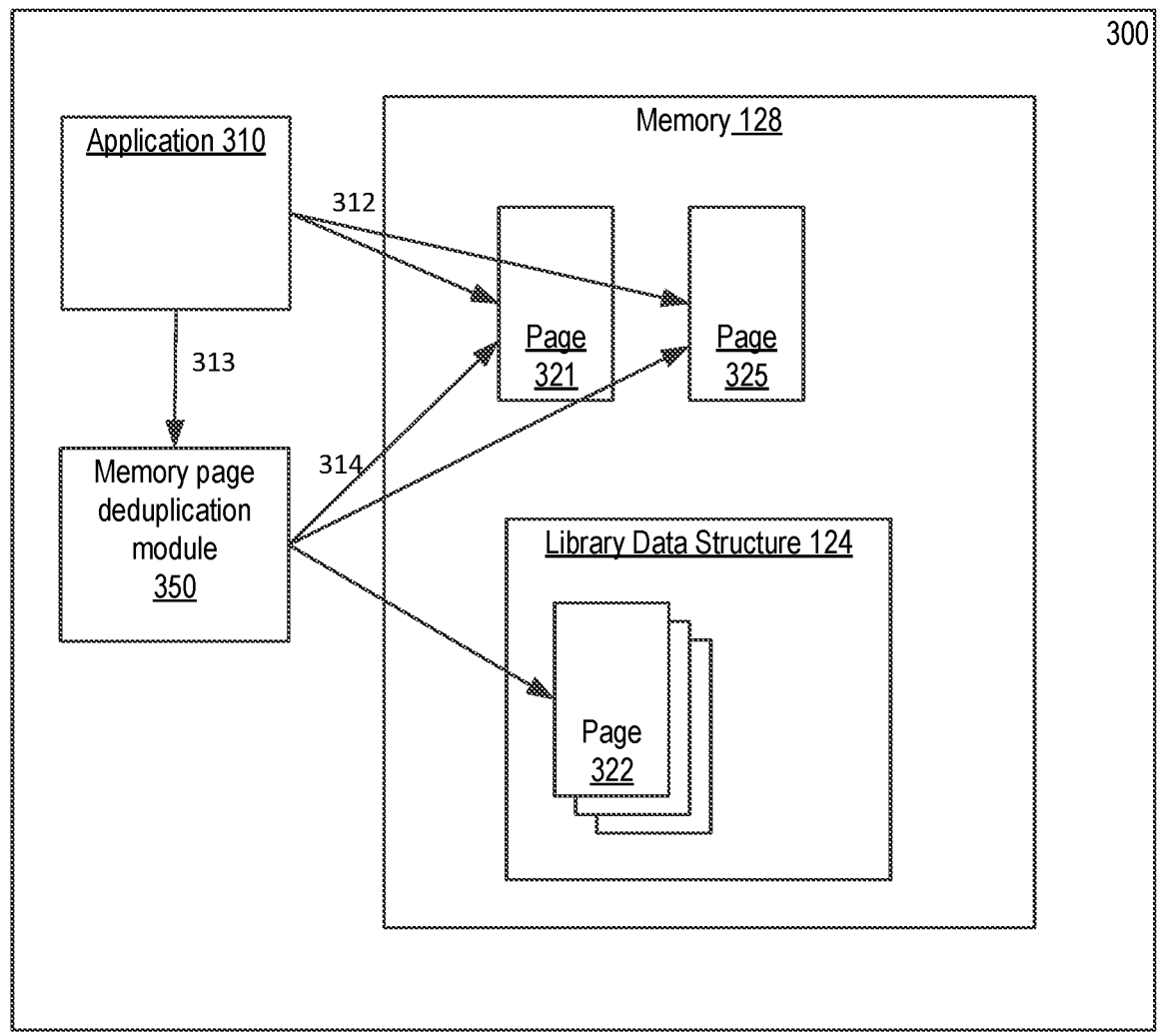
FIGS. 3A-B are block diagrams illustrating an example method of performing secure deduplication of memory pages in accordance with one or more aspects of the present disclosure.
Figure 3B:
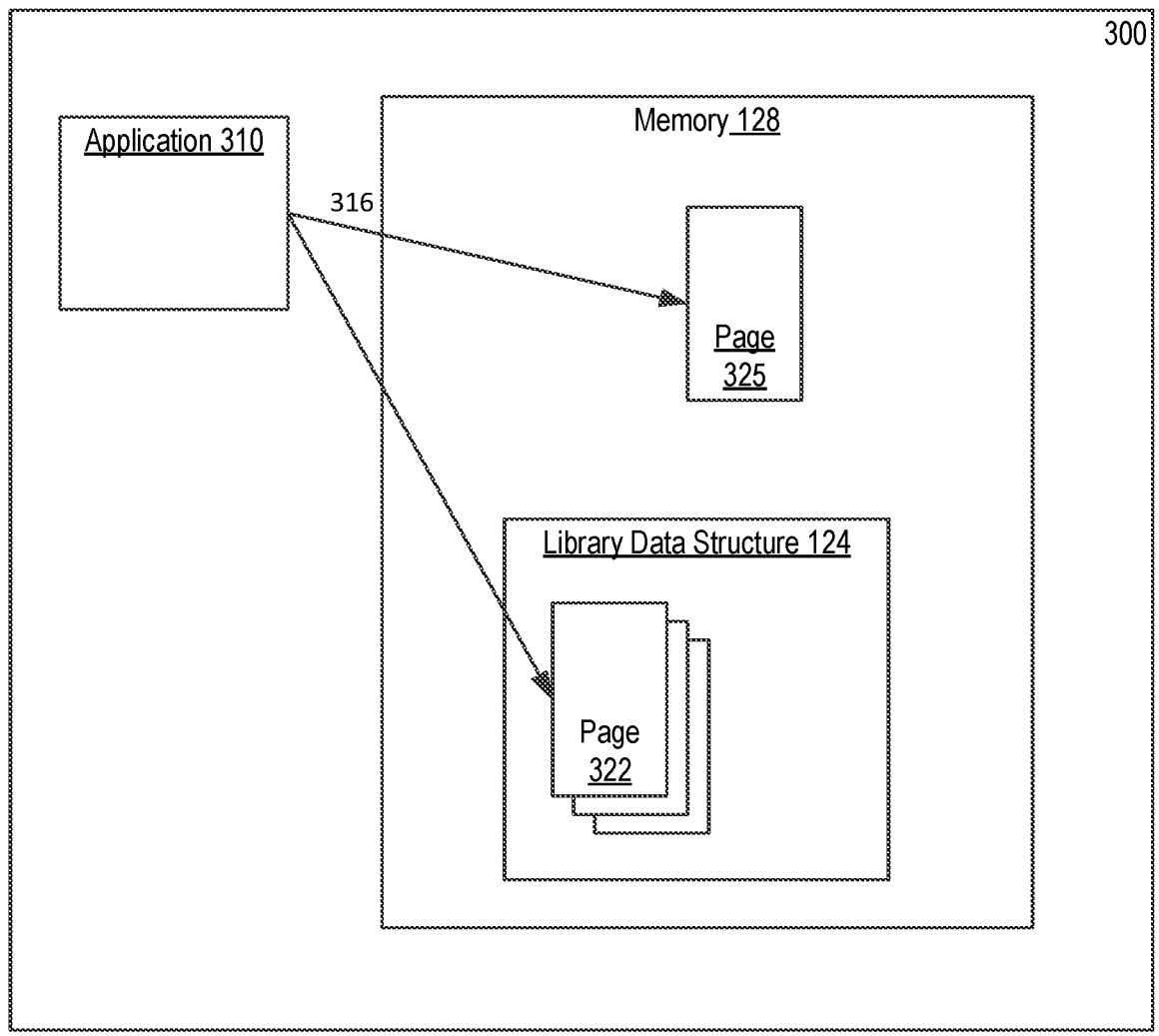

FIGS. 3A and 3B are block diagrams illustrating an example method 300 of performing secure memory deduplication of application memory pages in accordance with one or more aspects of the present disclosure. Method 300 may be performed by processing logic that includes hardware (e.g., circuitry, dedicated logic, programmable logic, microcode, etc.), software (e.g., instructions run on a processor to perform hardware simulation), or a combination thereof. Method 300 or each of its individual functions, routines, subroutines, or operations may be performed by one or more processors of a computer system (e.g., the computer system 200 of FIG. 2 or computer system 600 of FIG. 6) implementing the method. In an illustrative example, method 300 may be performed by a single processing thread. Alternatively, method 300 may be performed by two or more processing threads, each thread implementing one or more individual functions, routines, subroutines, or operations of the method. In an illustrative example, the processing threads implementing method 300 may be synchronized (e.g., using semaphores, critical sections, or other thread synchronization mechanisms). Alternatively, the processing threads implementing method 300 may be executed asynchronously with respect to each other. Therefore, while FIGS. 3A-B and the associated description lists the operations of method 300 in certain order, various implementations of the method may perform at least some of the described operations in parallel or in arbitrary selected orders. In certain implementations, application 310 may refer to one of applications 128A-C of FIG. 1.

Referring to FIG. 3A. In an illustrative example, at operation 312 application 310 may create memory pages 321 and 325 within memory 128 of a computer system. In implementations, creating memory pages may refer to a process of allocating memory for the memory pages and initializing the allocated memory pages. Application 310 may then have references to memory pages 321, 325. In an illustrative example, memory page 321 may contain no sensitive information while memory page 325 may contain security-sensitive information, for example, that was entered to memory by a user of application 310. At operation 313, application 310 may send references to memory pages 321 and 325 to page deduplication module 350 to perform memory deduplication of the two memory pages. In implementations, page deduplication module 350 may initiate memory deduplication logic in an attempt to deduplicate memory page 321, 325 with memory pages referenced by library data structure 124 and having identical contents to memory pages 321, 325.

At operation 314, memory page deduplication module 350 may determine whether or not for each memory page 321, 325, library data structure 124 contains a corresponding identical memory page. In implementations, memory page deduplication module 350 may identify two memory pages as identical by calculate a predetermined hash function of the contents of each memory page and determine if the hash values of each page match. In this example, because memory page 325 contains security-sensitive information, memory page deduplication module 350 may not find a memory page in library data structure 124 that is identical to memory page 325. Thus memory page 325 may not be deduplicated. On the other hand, because memory page 321 contains only publicly accessible information, memory page 321 may be deduplicated if its contents are identical to the contents of another memory page in library data structure 124.

Based on memory page comparison results, memory page deduplication module 350 may further identify memory page 322 within library data structure 124 with contents that are identical to contents of memory page 321. In certain implementation, memory page deduplication module 350 may consequently write-protect memory page 321 to avoid changes to its contents while deduplication is in progress. In one example, memory page deduplication module 350 may perform memory page comparison once again after memory page 321 has been write-protected. If contents of memory page 321 and contents of memory page 322 are still identical, memory page deduplication module 350 may perform memory deduplication of memory page 321 by modifying a pointer to memory page 321 within application 310 address space to point to memory page 322 of library data structure 124 instead. Memory page deduplication module 350 may further modify a page table entry of virtual memory page 321 to reference the physical address of memory page 322 instead. Memory page deduplication module 350 may then release memory page 321 from memory 128.

Referring to FIG. 3B. At operation 316, after memory page deduplication module 350 releases memory page 321 from memory 128, application 310 may continue contain a pointer to memory page 325 in memory 128 because memory page 325 was not deduplicated. Application 310 may contain a pointer to memory page 322 of library data structure 124. In implementations, other references to memory page 321 may now be updated to reference memory page 322 of library data structure 124. In other implementations, if application 310 attempts to modify memory page 322 of the library data structure 124, memory page deduplication module 350 may create a copy of memory page 322 in memory 128 and may apply the modification from application 310 to the copy of memory page 322, thus preserving the contents of memory page 322 within library data structure 124.

Figure 4:
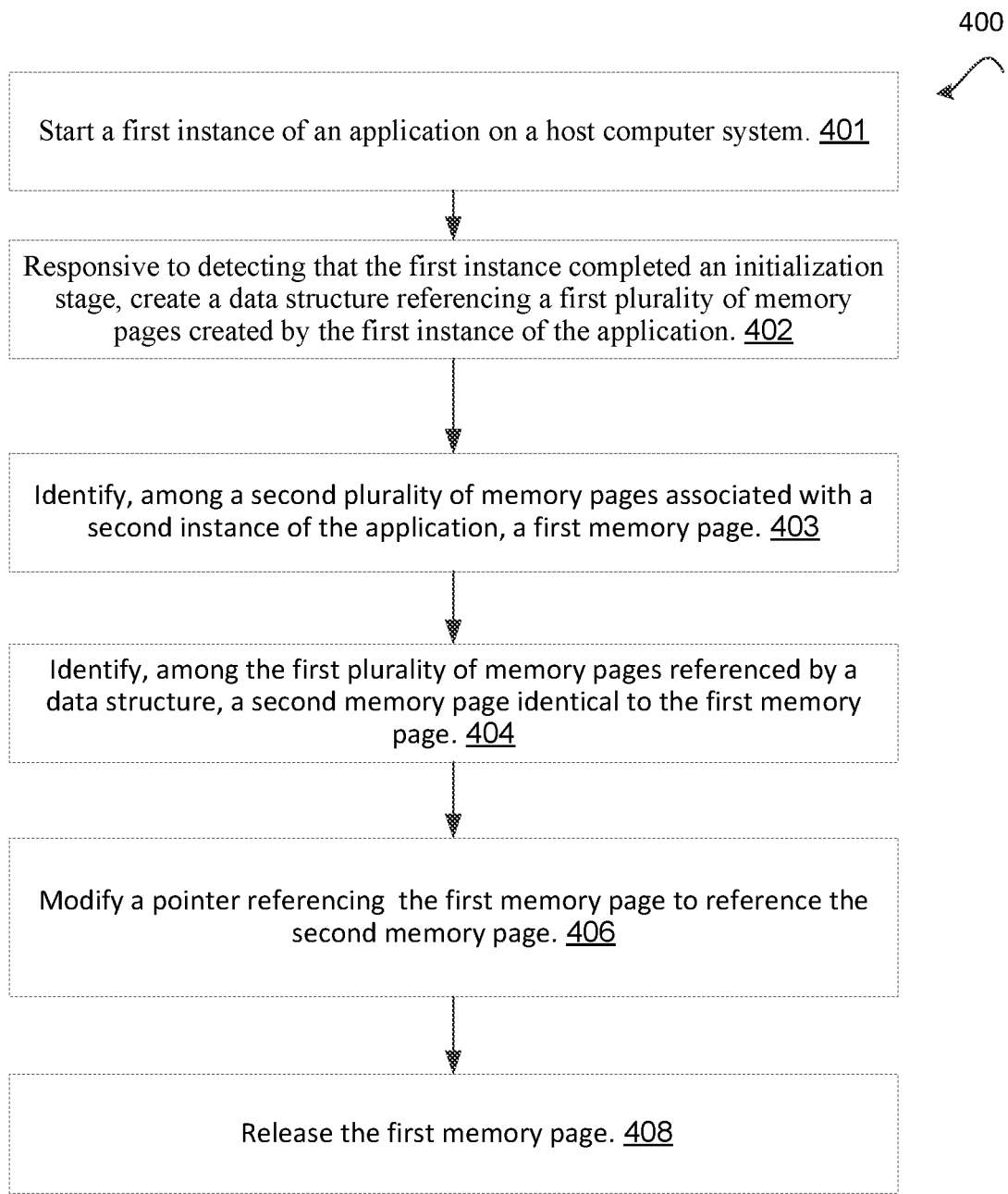
FIG. 4 is a flow diagram of another example method of performing secure deduplication of memory pages in accordance with one or more aspects of the present disclosure.

FIG. 4 is a flow diagram of another example method of performing secure memory deduplication of application memory pages in accordance with one or more aspects of the present disclosure. Method 400 may be performed by processing logic that includes hardware (e.g., circuitry, dedicated logic, programmable logic, microcode, etc.), software (e.g., instructions run on a processor to perform hardware simulation), or a combination thereof. Method 400 or each of its individual functions, routines, subroutines, or operations may be performed by one or more processors of a computer system (e.g., the computer system 200 of FIG. 2 or computer system 600 of FIG. 6) implementing the method. In an illustrative example, method 400 may be performed by a single processing thread. Alternatively, method 400 may be performed by two or more processing threads, each thread implementing one or more individual functions, routines, subroutines, or operations of the method. In an illustrative example, the processing threads implementing method 400 may be synchronized (e.g., using semaphores, critical sections, or other thread synchronization mechanisms). Alternatively, the processing threads implementing method 400 may be executed asynchronously with respect to each other. Therefore, while FIG. 4 and the associated description lists the operations of method 400 in certain order, various implementations of the method may perform at least some of the described operations in parallel or in arbitrary selected orders.

Referring to FIG. 4, at block 401, the processing logic may start a first instance of an application on a host computer system. In implementations, the first instance may be used to create a library for deduplicating memory of the application, as explained in more details herein.

At block 402, responsive to detecting that the first instance completed an initialization stage, the processing logic may create a data structure referencing a first plurality of memory pages created by the first instance of the application. In implementations, after the initialization stage the memory of the first instance may be contain publicly accessible information and no security sensitive information, thus may be used for secure memory deduplication of the application, as explained in more details herein.

At block 403, the processing logic may identify, among a second plurality of memory pages associated with the application, a first memory page. In implementations, the first memory page may be identified by a memory address of the first memory page. In other implementations, the processing logic may determine whether memory deduplication may be applied to the first memory page, as described in more detail herein above. In certain implementations, the second plurality of memory pages may be associated with a different application than the first plurality of memory pages (e.g. when the two applications share common libraries). In this case, because the two applications share at least a set of libraries, memory deduplication may be performed by comparing memory pages of the first application with memory pages of a library data structure containing memory page of the second application.

At block 404, the processing logic may identify, among the first plurality of memory pages referenced by the data structure, a second memory page with contents that are identical to contents of the first memory page. In implementations, the data structure may contain references to memory pages comprising publicly-accessible information and no security-sensitive information. In an illustrative example, the data structure may reference the second memory page using a pointer to the memory page, as described in more detail herein above.

At block 406, the processing logic may modify a pointer referencing the first memory page to reference the second memory page. Further, the processing logic may modify all references to the first memory page to reference the second memory page of the data structure, as described above. At block 408, the processing logic may then release the first memory page. In implementations, releasing the first memory page may include deleting the memory page from memory and freeing the memory space occupied by the first memory page.

Figure 5:
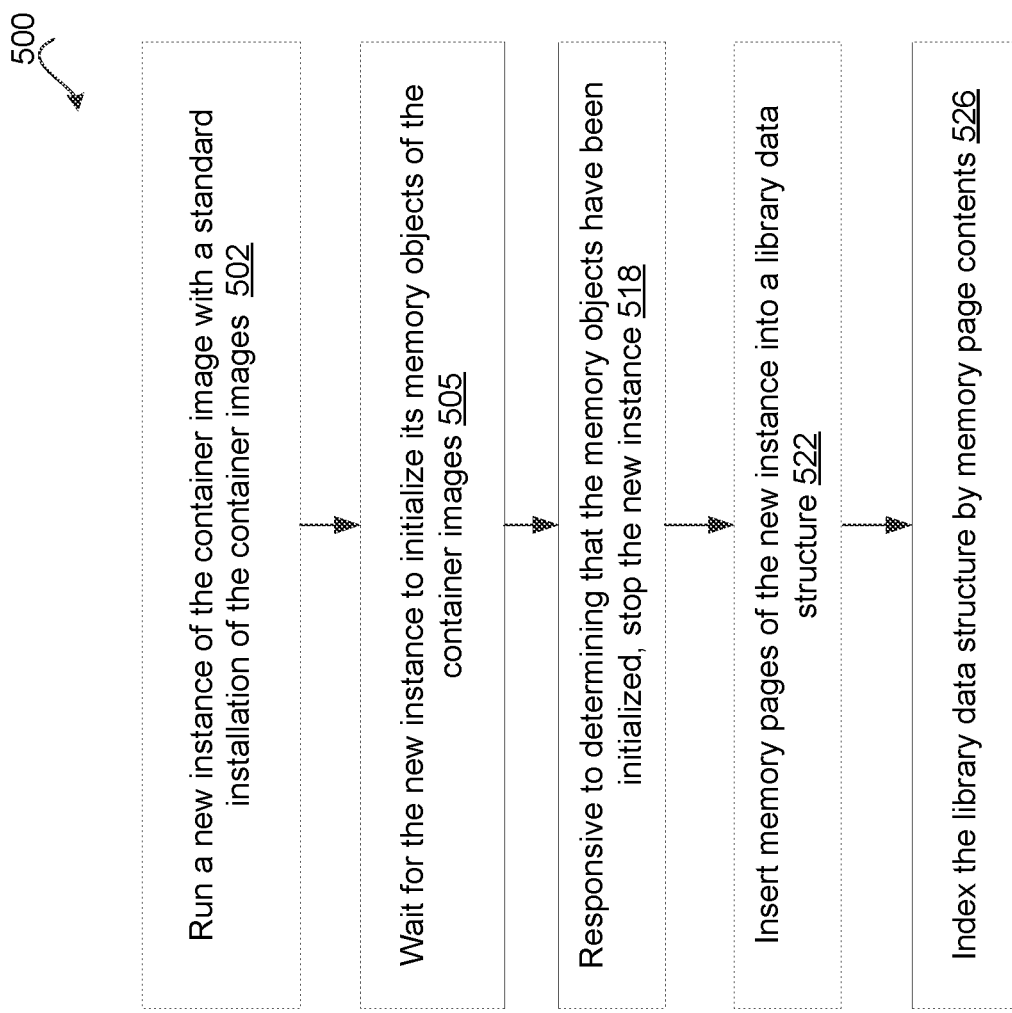
FIG. 5 is a flow diagram of an example method of creating a library data structure, in support of performing library-based memory deduplication, in accordance with one or more aspects of the present disclosure.

FIG. 5 is a flow diagram of an example method of creating a library data structure, in support of performing secure memory deduplication of application memory pages, in accordance with one or more aspects of the present disclosure. Method 500 may be performed by processing logic that includes hardware (e.g., circuitry, dedicated logic, programmable logic, microcode, etc.), software (e.g., instructions run on a processor to perform hardware simulation), or a combination thereof. Method 500 or each of its individual functions, routines, subroutines, or operations may be performed by one or more processors of a computer system (e.g., the computer system 200 of FIG. 2 or computer system 600 of FIG. 6) implementing the method. In an illustrative example, method 500 may be performed by a single processing thread. Alternatively, method 500 may be performed by two or more processing threads, each thread implementing one or more individual functions, routines, subroutines, or operations of the method. In an illustrative example, the processing threads implementing method 500 may be synchronized (e.g., using semaphores, critical sections, or other thread synchronization mechanisms). Alternatively, the processing threads implementing method 500 may be executed asynchronously with respect to each other. Therefore, while FIG. 5 and the associated description lists the operations of method 500 in certain order, various implementations of the method may perform at least some of the described operations in parallel or in arbitrary selected orders.

Referring to FIG. 5, at operation 502, the processing logic may run a new instance of the image of a container running on a host computer system. The new instance may contains a standard installation of the container images. In certain implementations, the new instance of the container with only the standard executables may not have security-sensitive information, as it is publicly accessible to anyone with access to the container images.

At operation 505, the processing logic may wait for the new instance to initialize the memory objects of the new instance. In implementations, the processing logic may receive a notification from the new instance that all memory objects have been initialized. In other examples, the processing logic may detect the completeness of the memory initialization by detecting that input/output operations of the new instance are slowing down or stopped. In yet another example, the processing logic may wait for a pre-determined period of time that is sufficient for memory initialization activities to be complete.

At operation 518, responsive to determining that memory initialization activities are complete, the processing logic may stop the execution of new instance of the container. In certain implementations, stopping the execution of the new instance ensures that no further updates may be done to the memory of the new instance, thus further ensuring that no security-sensitive information may be stored in the memory of the new instance.

At operation 522, the processing logic may then create a library data structure that may be used for memory deduplication of memory pages of the other containers in the host computer system. The memory pages containing the data of the new instance may then be referenced by the library data structure. In one example, the processing logic may insert the memory pages of the new instance in the library data structure. In another example, the processing logic may insert pointers to memory pages into the library data structure. In this case, the physical memory pages may exist outside the library data structure but referenced by pointers in the library data structure, as explained in more details herein above.

At operation 526, in an example where memory pages are inserted in the library data structure, the processing logic may index the library data structure by memory page contents. In certain implementations, indexing by memory page contents may enable faster search and retrieval of memory pages from the library data structure.

Figure 6:
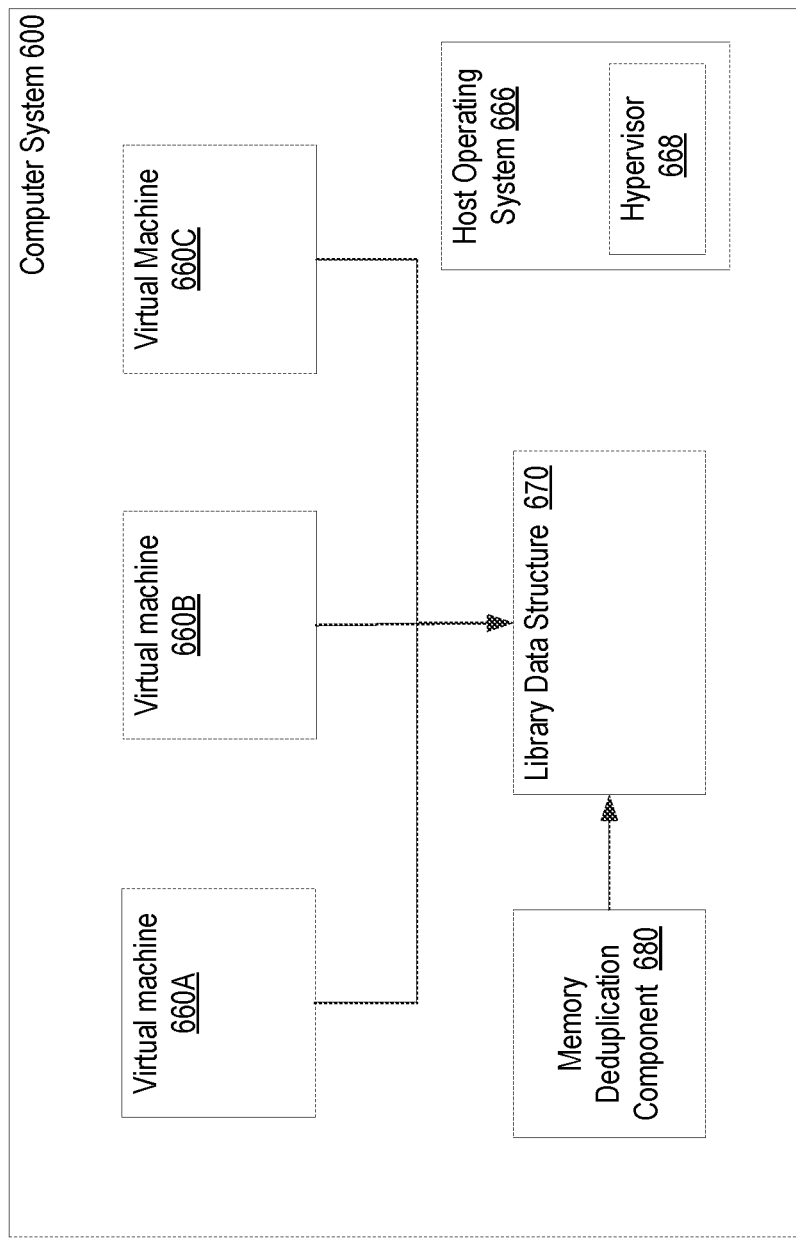
FIG. 6 is a block diagram illustrating another example components and modules of computer system, in accordance with one or more aspects of the present disclosure.

FIG. 6 is a block diagram illustrating example components and modules of computer system 600, in accordance with one or more aspects of the present disclosure. Computing system 600 may be the same or similar to host computer system 100 of FIG. 1. The components, modules, or features discussed in regards to computer system 600 may be consolidated to a single computing device or may be spread across multiple computing devices.

In the example, Virtual machines (VM) 660A-C may execute a guest operating system, which may utilize underlying virtual processors (vCPUs), virtual memory, and virtual I/O devices. Virtual machines 660A-C may be run by a hypervisor 180 as a virtual machine manager that may abstract the physical layer, including physical processors, memory, and I/O devices, and present this abstraction to the virtual machines as virtual devices. In this example, VMs 660A-C may have access to virtual memory pages that may be deduplicated with memory pages of library data structure 670, as explained in detailed herein above.

In one illustrative example, hypervisor 180 may be a component of host operating system 185 executed by host computer system 600. Alternatively, hypervisor 668 may be provided by an application running under host operating system 185, or may run directly on host computer system 600 without an operating system beneath it. Hypervisor 180 may manage the execution of VMs 660A-C.

Memory deduplication component 680 may be a software component that provides method for providing library-based memory deduplication using library data structure 670. In accordance with one or more aspects of the present disclosure, memory deduplication component 680 may identify a memory page of a VM 660A-C as a candidate for memory deduplication. In implementations, the memory page may be identified using a background job running in a dedicated thread to perform memory deduplication on at least a subset of memory pages associated with the VM. In implementations, the memory page may be a virtual memory page that resides in the guest address space of the VM. Memory deduplication component 680 may then determine whether contents of the memory page are identical to contents of another memory page referenced by library data structure 670. In certain implementations, memory deduplication component 680 may write-protect the memory page and may compare contents of the write-protected memory page to contents of another memory page in library data structure 670.

When memory deduplication component 680 identifies a memory page from library data structure 670 with contents that are identical to the contents of the VM memory page, memory deduplication component 680 may deduplicate the memory page by modifying a pointer of the VM memory page to point to the memory page from the library data structure 670. For example, memory deduplication component 680 may modify a mapping within the guest memory of the VM to point to the memory page of library data structure 670. In implementations, modifying a pointer to the memory page may include modifying a mapping of a virtual memory page to a physical memory page to map to a different physical memory page. Memory deduplication component 126 may then release the VM memory page from the guest memory of the VM.

Library data structure 670 may be a data structure created in the host memory in order to provide a pay load of memory pages that does not contain security sensitive information. For example, library data structure 670 may be created from publicly accessible data that has not been updated with security-sensitive or user-specific information. In implementations, memory deduplication component 680 may create library data structure 670 at host startup time by running a new VM, for example. The memory deduplication component 680 may stop the new VM after its memory objects have been initialized, in order to ensure that the VM has reached a steady state. In an illustrative example, the memory deduplication component 680 may detect that the new VM has reached a steady state when the virtual CPUs of the new VM become idle. The memory pages containing the data of the new VM may then be referenced by library data structure 670, as explained in more details herein above.

Figure 7:
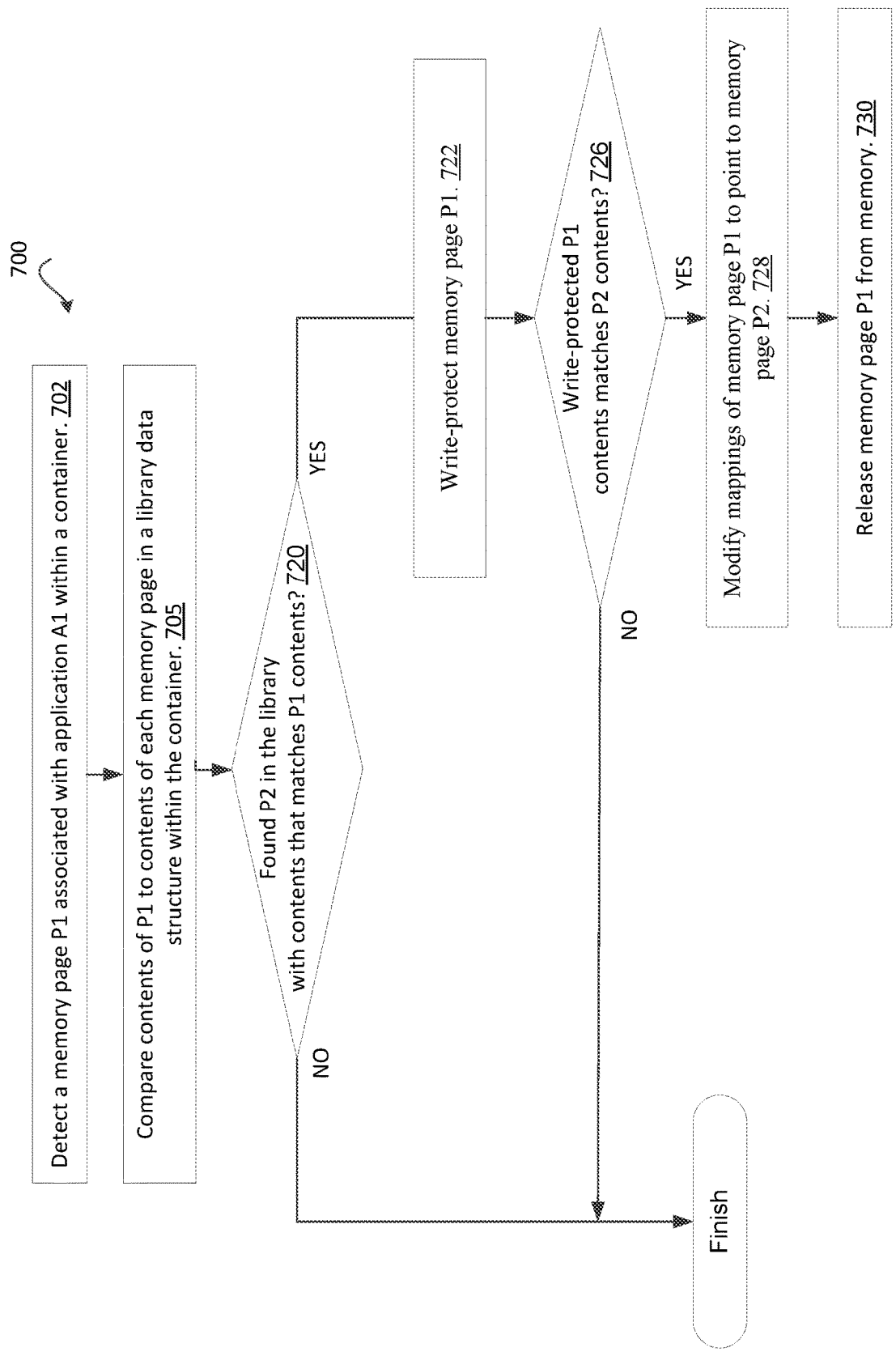
FIG. 7 is a flow diagram of an example method of deduplicating a memory page of an application using a library data structure, in accordance with one or more aspects of the present disclosure.

FIG. 7 is a flow diagram of an example method of deduplicating a memory page of an application running within a container, using a library data structure, in accordance with one or more aspects of the present disclosure. Method 700 may be performed by processing logic that includes hardware (e.g., circuitry, dedicated logic, programmable logic, microcode, etc.), software (e.g., instructions run on a processor to perform hardware simulation), or a combination thereof. Method 700 or each of its individual functions, routines, subroutines, or operations may be performed by one or more processors of a computer system (e.g., the computer system 200 of FIG. 2 or computer system 600 of FIG. 6) implementing the method. In an illustrative example, method 700 may be performed by a single processing thread. Alternatively, method 700 may be performed by two or more processing threads, each thread implementing one or more individual functions, routines, subroutines, or operations of the method. In an illustrative example, the processing threads implementing method 700 may be synchronized (e.g., using semaphores, critical sections, or other thread synchronization mechanisms). Alternatively, the processing threads implementing method 700 may be executed asynchronously with respect to each other. Therefore, while FIG. 7 and the associated description lists the operations of method 700 in certain order, various implementations of the method may perform at least some of the described operations in parallel or in arbitrary selected orders.

Referring to FIG. 7, at operation 702 the processing logic may detect a memory page P1 associated with application A1 within a container. In implementations, memory deduplication logic described herein may be applicable to an application within a container within the host computer system. In this case, a library data structure L1 for performing memory deduplication of the container may be created from a new instance of the container, and a library data structure L2 may be created from a new instance of application A1 for performing memory deduplication of A1 memory. In certain implementations, the container may be a virtual machine running on the host computer system. At operation 705, the processing logic may compare contents of P1 with contents of each memory page in a library data structure L2 within the container, in order to find a memory page in the library data structure L2 with contents that are identical to contents of memory page P1, as described in details herein above.

At operation 720, the processing logic makes a determination whether a memory page P2 of the library data structure L2 has contents that matches P1 content. If P2 is found, the processing logic at 722 may write-protect memory page P1. In implementations, write-protect a memory page may prevent contents of the memory page from being updated by application A1, thus ensuring that no changes may be applied to P1 while the memory deduplication algorithm is being performed. At operation 726, the processing logic may perform another test to see if contents of the write-protected memory page P1 still matches contents of memory page P2.

At operation 728, if contents of memory page P1 and memory page P2 still match, the processing logic may modify a page table entry of virtual memory page P1 to reference the physical address of memory page P2 instead, as described in more details herein above.

At operation 730, after all mappings and pointers have been modified to point to memory page P2, the processing logic may release memory page P1 from memory. In implementations, releasing memory page P1 may include deallocating memory that was occupied by memory page P1, as described in more details herein above.

Figure 8:
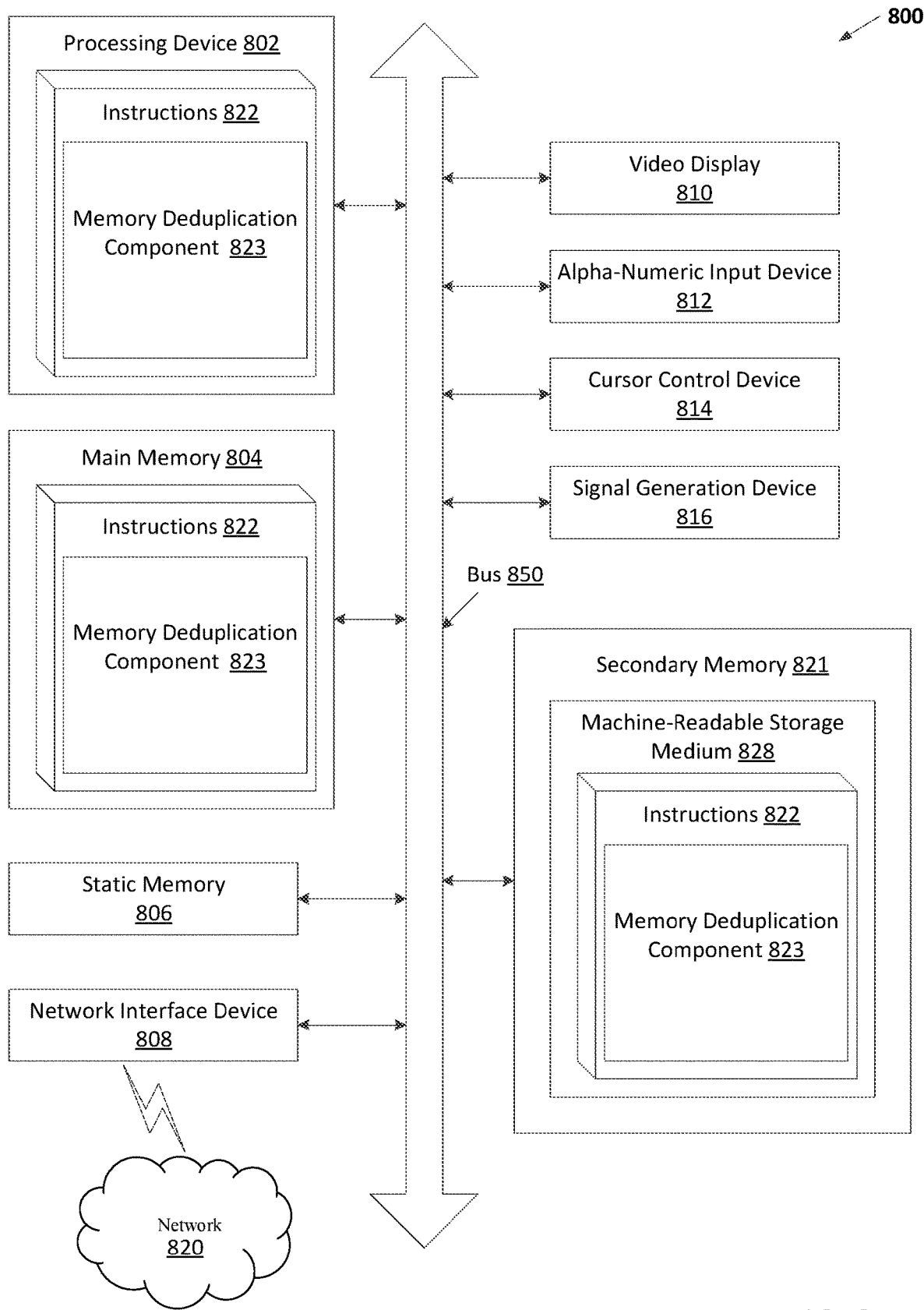
FIG. 8 illustrates a diagrammatic representation of a machine in the exemplary form of a computer system, in accordance with one or more aspects of the present disclosure.

FIG. 8 illustrates a diagrammatic representation of a machine in the exemplary form of a computer system 800 within which a set of instructions, for causing the machine to perform any one or more of the methodologies discussed herein, may be executed. The computer system 800 may correspond to host 100 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 816 (e.g., a data storage device), which communicate with each other via a bus 850.

The processing device 802 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 802 may therefore include multiple processors. The processing device 802 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 802 may also be one or more special-purpose processing devices such as an application specific integrated circuit (ASIC), a field programmable gate array (FPGA), a digital signal processor (DSP), network processor, or the like.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The secondary memory 821 may include a machine-readable storage medium (or more specifically a computer-readable storage medium) 828 on which is stored one or more sets of instructions 822 embodying any one or more of the methodologies or functions described herein (e.g., memory deduplication component 823). The instructions 822 may also reside, completely or at least partially, within the main memory 804 and/or within the processing device 802 during execution thereof by the computer system 800; the main memory 804 and the processing device 802 also constituting machine-readable storage media.

While computer-readable storage medium 828 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by component modules or functional circuitry within hardware devices. Further, the methods, components, and features may be implemented in any combination of hardware devices and computer program components, or in computer programs.

Unless specifically stated otherwise, terms such as "reading," "setting," "detecting," "obtaining," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300-400 of FIGS. 3-4 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

Other computer system designs and configurations may also be suitable to implement the systems and methods described herein. The following examples illustrate various implementations in accordance with one or more aspects of the present disclosure.

Example 1 is a method comprising: starting a first instance of an application on a host computer system; responsive to detecting that the first instance completed an initialization stage, creating a data structure referencing a first plurality of memory pages created by the first instance of the application; identifying, among a second plurality of memory pages associated with a second instance of the application, a first memory page; identifying, among the first plurality of memory pages referenced by the data structure, a second memory page identical to the first memory page; modifying a pointer referencing the first memory page to reference the second memory page; and releasing the first memory page.

Examples 2 is a method of example 1, wherein the data structure comprises an array of pointers to memory pages.

Example 3 is a method of example 1, wherein the data structure is indexed by memory page contents.

Example 4 is a method of example 1, further comprising: write-protecting the first plurality of memory pages referenced by the data structure.

Example 5 is a method of example 1, wherein responsive to detecting that the first instance completed the initialization stage, stopping the first instance of the application.

Example 6 is a method of example 1, wherein the data structure further comprises a plurality of hash values of the second plurality of memory pages.

Example 7 is a method of example 1, wherein the application is one of a virtual machine, a container, or a process running on the host computer system.

Example 8 is a method of example 1, wherein modifying a pointer referencing the first memory page comprises modifying a page table entry associated with the first memory page.

Example 9 is a system comprising: a memory; and a processing device operatively coupled to the memory, wherein the processing device is further to: start a first instance of an application on a host computer system; responsive to detecting that the first instance completed an initialization stage, create a data structure referencing a plurality of memory pages created by the first instance of the application; run a background process to identify a first memory page associated with the application, among the plurality of memory pages referenced by the data structure, a second memory page identical to the first memory page; modify a pointer referencing the first memory page to reference the second memory page; and release the first memory page.

Example 10 is a system of example 9, wherein the data structure comprises an array of pointers to memory pages.

Example 11 is a system of example 9, wherein the data structure is indexed by memory page contents.

Example 12 is a system of example 9, wherein the processing device is further to: write-protect the plurality of memory pages referenced by the data structure.

Example 13 is a system of example 9, wherein the data structure further comprises a plurality of hash values of the second plurality of memory pages.

Example 14 is a system of example 9, wherein the process is at least one of a virtual machine, a container, or a process running on the host computer system.

Example 15 is a system of example 9, wherein to modify a pointer referencing the first memory page, the processing device is further to modify a page table entry associated with the first memory page.

Example 16 is a system of example 9, wherein to release the first memory page, the processing device is further to deallocate memory blocks occupied by the first memory page from memory of the host computer system.

Example 17 is a non-transitory computer-readable storage medium comprising executable instructions that, when executed by a processing device, cause the processing device to: start a first instance of an application on a virtual machine being executed by a host computer system; responsive to detecting that the first instance completed an initialization stage, create a data structure referencing a first plurality of memory pages created by the first instance of the application; identify, among a first second plurality of memory pages associated with an instance of an the application running on a virtual machine being executed by a host computer system, a first memory page; identify, among a second the first plurality of memory pages referenced by a the data structure associated with the application, a second memory page that is identical to the first memory page; modify a pointer referencing the first memory page to reference the second memory page; release the first memory page.

Example 18 is a non-transitory computer-readable storage medium of example 17, wherein the second plurality of memory pages of the data structure are indexed by memory page contents.

Example 19 is a non-transitory computer-readable storage medium of example 17, wherein the processing device is further to: write-protect the plurality of memory pages referenced by the data structure.

Example 20 is a non-transitory computer-readable storage medium of example 17, wherein the data structure further comprises a plurality of hash values of the third plurality of memory pages.

Example 21 is an apparatus comprising: a means to identify, by a processing device, among a first plurality of memory pages associated with a first instance of an application running on a first virtual machine being executed by a host computer system, a first memory page; a means to identify, among a second plurality of memory pages associated with a second instance of the application running on a second virtual machine being executed by the host computer system, a second memory page; a means to identify, among a third plurality of memory pages referenced by a data structure, a third memory page identical to the first memory page and a fourth page identical to the second page; a means to modify a pointer referencing the first memory page to reference the third memory page; a means to modify a pointer referencing the second memory page to reference the fourth memory page; and a means to release the first memory page and the second memory page.

Example 22 is an apparatus of example 21, wherein the third plurality of memory pages of the first data structure are indexed by memory page contents.

Example 23 is an apparatus of example 21, wherein the first instance of the application is a process running on the first virtual machine and the second instance of the application is a process running on the second virtual machine.

Example 24 is an apparatus of example 21, wherein the data structure further comprises a plurality of hash values of the third plurality of memory pages.

Example 25 is an apparatus of example 21, wherein modifying a pointer referencing the first memory page further comprises a means to modify a page table entry associated with the first memory page.

Example 26 is an electronic device, comprising: a memory; and a processing device operatively coupled to the memory, wherein the processing device is further to: run a background process to identify a first memory page associated with an application running on a host computer system; identify, among a plurality of memory pages referenced by a data structure, a second memory page identical to the first memory page; modify a pointer referencing the first memory page to reference the second memory page; and release the first memory page.

Example 27 is an electronic device of example 26, wherein the data structure comprises an array of pointers to memory pages.

Example 28 is an electronic device of example 26, wherein the data structure is indexed by memory page contents.

Example 29 is an electronic device of example 26, wherein to identify the second memory page identical to the first memory page, the processing device is further to: compare a first hash value of the first memory page to a second hash value of the second memory page; and responsive to determining that the first hash value matches the second hash value, perform byte-to-byte comparison of the first memory page and the second memory page.

Example 30 is an electronic device of example 26, wherein the data structure further comprises a plurality of hash values of the second plurality of memory pages.

Example 31 is an electronic device of example 26, wherein the process is at least one of a virtual machine, a container, or a process running on the host computer system.

Example 32 is an electronic device of example 26, wherein to modify a pointer referencing the first memory page, the processing device is further to modify a page table entry associated with the first memory page.

Example 33 is an electronic device of example 26, wherein to release the first memory page, the processing device is further to deallocate memory blocks occupied by the first memory page from memory of the host computer system.

Example 34 is method comprising: creating, by a hypervisor running on a host computer system, a first data structure for deduplicating memory of a container hosted on the host; creating, by the hypervisor, a second data structure for deduplicating memory of a process running within the container; deduplicating memory of the container, except memory used by the process, using the first data structure; and deduplicating memory of the process using the second data structure.

What is claimed is:
1. A method comprising:
   starting a first instance of an application on a host computer system;

responsive to detecting that the first instance completed an initialization stage:
  preventing the first instance from storing user-specific data by, stopping execution of the first instance of the application after memory objects of the first instance have been initialized and prior to the first instance of the application receiving user-specific data; and
  creating a data structure referencing a first plurality of memory pages created by the first instance of the application;
identifying, among a second plurality of memory pages associated with a second instance of the application a first memory page;
identifying, among the first plurality of memory pages referenced by the data structure, a second memory page identical to the first memory page;
modifying a pointer referencing the first memory page to reference the second memory page; and
releasing the first memory page.

2. The method of claim 1, wherein the data structure comprises an array of pointers to the first plurality of memory pages.

3. The method of claim 1, wherein the data structure is indexed by memory page contents.

4. The method of claim 1 further comprising:
write-protecting the first plurality of memory pages referenced by the data structure.

5. The method of claim 1, wherein detecting that the first instance completed the initialization stage further comprises:
detecting that libraries of the first instance of the application are loaded into memory.

6. The method of claim 1, wherein detecting that the first instance completed the initialization stage further comprises:
detecting that the first instance of the application is in an idle state.

7. The method of claim 1, wherein identifying the second memory page identical to the first memory page further comprises:
determining that contents of the second memory page are identical to contents of the first memory page.

8. The method of claim 1, wherein creating the first plurality of memory pages by the first instance of the application further comprising allocating the first plurality of memory pages in memory and initializing the first plurality of memory pages.

9. The method of claim 1, wherein the application is one of a virtual machine, a container, or a process running on the host computer system.

10. The method of claim 1, wherein modifying a pointer referencing the first memory page comprises modifying a page table entry associated with the first memory page.

11. A system comprising:
a memory; and
a processing device operatively coupled to the memory, wherein the processing device is to:
  start a first instance of an application on a host computer system;
  responsive to detecting that the first instance completed an initialization stage:
    prevent the first instance from storing user-specific data by, stopping execution of the first instance of the application after memory objects of the first instance have been initialized and prior to the first instance of the application receiving user-specific data; and
    create a data structure referencing a plurality of memory pages created by the first instance of the application;
  run a background process to identify a first memory page associated with the application;
  identify, among the plurality of memory pages referenced by the data structure, a second memory page identical to the first memory page;
  modify a pointer referencing the first memory page to reference the second memory page; and
  release the first memory page.

12. The system of claim 11, wherein the data structure is indexed by memory page contents.

13. The system of claim 11, wherein the processing device is further to:
write-protect the plurality of memory pages referenced by the data structure.

14. The system of claim 11, wherein the process is at least one of a virtual machine, a container, or a process running on the host computer system.

15. The system of claim 11, wherein to modify a pointer referencing the first memory page, the processing device is further to modify a page table entry associated with the first memory page.

16. The system of claim 11, wherein to release the first memory page, the processing device is further to deallocate memory blocks occupied by the first memory page from memory of the host computer system.

17. A non-transitory computer-readable storage medium comprising executable instructions that, when executed by a processing device, cause the processing device to:
start a first instance of a first application on a virtual machine being executed by a host computer system;
responsive to detecting that the first instance completed an initialization stage:
  prevent the first instance from storing user-specific data by stopping execution of the first instance of the application after memory objects of the first instance have been initialized and prior to the first instance of the application receiving user-specific data; and
  create a data structure referencing a first plurality of memory pages created by the first instance of the application;
identify, among a second plurality of memory pages associated with a second application, a first memory page, wherein the first application and the second application share a plurality of common libraries;
identify, among the first plurality of memory pages referenced by the data structure associated with the first application, a second memory page that is identical to the first memory page;
modify a pointer referencing the first memory page to reference the second memory page; and
release the first memory page.

18. The non-transitory computer-readable storage medium of claim 17, wherein the first plurality of memory pages of the data structure are indexed by memory page contents.

19. The non-transitory computer-readable storage medium of claim 17, wherein the processing device is further to:
write-protect the first plurality of memory pages referenced by the data structure.

20. The non-transitory computer-readable storage medium of claim 17, wherein the data structure further comprises a plurality of hash values of the first plurality of memory pages.

* * * * *